US008657440B2

(12) United States Patent
Iwase et al.

(10) Patent No.: US 8,657,440 B2
(45) Date of Patent: Feb. 25, 2014

(54) IMAGE PROCESSING APPARATUS AND IMAGE PROCESSING METHOD

(75) Inventors: Yoshihiko Iwase, Yokohama (JP); Akihiro Katayama, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 349 days.

(21) Appl. No.: 12/943,122

(22) Filed: Nov. 10, 2010

(65) Prior Publication Data

US 2011/0134392 A1    Jun. 9, 2011

(30) Foreign Application Priority Data

Dec. 8, 2009    (JP) ................. 2009-278945

(51) Int. Cl.
*A61B 3/14*     (2006.01)
*A61B 3/00*     (2006.01)
*A61B 3/10*     (2006.01)

(52) U.S. Cl.
USPC ............ 351/206; 351/200; 351/210; 351/221

(58) Field of Classification Search
USPC ......... 351/206, 200, 205, 208–210, 221–223, 351/245–246
See application file for complete search history.

(56) References Cited

U.S. PATENT DOCUMENTS

| | | | |
|---|---|---|---|
| 5,321,501 A | 6/1994 | Swanson et al. ............ | 356/479 |
| 7,789,511 B2 | 9/2010 | Aoki et al. | |
| 2003/0199769 A1 | 10/2003 | Podoleanu et al. ........... | 600/476 |
| 2008/0234972 A1 | 9/2008 | Tsukada et al. ............. | 702/155 |
| 2008/0259275 A1 | 10/2008 | Aoki et al. | |
| 2010/0007848 A1* | 1/2010 | Murata ........................ | 351/206 |

FOREIGN PATENT DOCUMENTS

| | | |
|---|---|---|
| EP | 1962083 A1 | 8/2008 |
| JP | 2008-054773 A | 3/2008 |
| JP | 2008-237238 | 10/2008 |

OTHER PUBLICATIONS

Communication dated Mar. 21, 2011, in counterpart European Application No. 10193985.8-2218.
European Search Report dated Mar. 4, 2011, in counterpart European Application No. 10193985.8-2218.
Hammer, Daniel X. et al., "Active retinal tracker for clinical optical coherence tomography systems", Journal of Biomedical Optics, vol. 10, No. 2, Apr. 13, 2005, pp. 024038-1 to 024038-11.
Srinivasan, Vivek J. et al., "High-Definition and 3-dimensional Imaging of Macular Pathologies with High-speed Ultrahigh-Resolution Optical Coherence Tomography", Ophthalmology, J.B. Lippincott Col, Philadelphia, PA, vol. 113, No. 11, Nov. 1, 2006, pp. 2054-2065g.

(Continued)

*Primary Examiner* — Dawayne A Pinkney
(74) *Attorney, Agent, or Firm* — Fitzpatrick, Cella, Harper & Scinto

(57) ABSTRACT

This invention can generate a high-resolution, low-noise tomogram while minimizing the influences of the flicks of the eyeballs, the movement of the head, and the like. The invention is an image processing apparatus which processes a tomogram of an eye to be examined and includes detection units to detect the motion amount of the eye by using a signal obtained by capturing the tomogram, and a decision unit to decide the number of scanning lines for capturing of the tomogram based on the motion amount detected by the detection units.

39 Claims, 8 Drawing Sheets

(56) References Cited

OTHER PUBLICATIONS

Jorgensen, Thomas M. et al., "Enhancing the signal-to-noise ratio in ophthalmic optical coherence tomography by image registration—method and clinical examples", Journal of Biomedical Optics, vol. 12, No. 4, Aug. 23, 2007; pp. 041208-1 to 041208-10.

Zawadzki, Robert J. et al., "Ultra-high resolution adaptive optics: optical coherence tomography for in vivo imaging of healthy and diseased retinal structures", Proc. Spie Ophthalmic Technologies XVIII, vol. 6844, Jan. 19, 2008, pp. 1-9.

Schuman, Joel S., "Spectral Domain Optical Coherence Tomography for Glaucoma (An AOS Thesis)", Trans AM Ophthalmol Soc., vol. 106, Dec. 1, 2008, pp. 426-458.

C. Tomasi et al., "Detection and Tracking of Point Features", Tech. Report CMU-CS-91-132 (Carnegie-Mellon, Pittsburgh, PA, Apr. 1991).

* cited by examiner

- START OF TOMOGRAM PROCESSING
- ACQUIRE TOMOGRAM AND FUNDUS IMAGE — S701
- DETECT MOTION AMOUNTS — S702
- COMPOSITE PIXEL SELECTION — S703
- GENERATE TOMOGRAM — S704
- DISPLAY TOMOGRAM — S705
- END OF TOMOGRAM PROCESSING

- COMPOSITE PIXEL SELECTION PROCESSING
- SELECT REFERENCE TOMOGRAM — S710
- S720: DOES REFERENCE TOMOGRAM SATISFY CONDITIONS?
  - YES →
  - NO → SELECT SCANNING LINE — S730
- RETURN

9a

9b

9c

9d

IMAGE PROCESSING APPARATUS AND IMAGE PROCESSING METHOD

BACKGROUND OF THE INVENTION

1. Field of the Invention

The present invention relates to an image processing apparatus and image processing method which process the tomograms captured by a tomography apparatus.

2. Description of the Related Art

An ophthalmic tomography apparatus such as an optical coherence tomography (OCT) apparatus is configured to generate an image (or tomogram) of a retina from a signal produced through the interference between near-infrared light reflected from the retina and reference light. In general, the image quality of a tomogram generated based on interference light in this manner depends on the intensity of near-infrared light striking the retina. In order to improve the image quality of a tomogram, it is necessary to increase the intensity of near-infrared light applied to the retina. The intensity of near-infrared light which can be applied to the retina has a certain limit from the viewpoint of safety.

It is therefore required to generate tomograms with high image quality while applying near-infrared light within an intensity range which is deemed to be safe. Attempts have been made to meet this requirement, mainly based on the following two methods:

(i) a method using oversampling; and
(ii) a method using averaging.

Attempts based on these two prior art methods will be briefly described below.

The oversampling method will be described first with reference to FIG. 9. In FIG. 9, 9a shows an example of a tomogram of the retina imaged by a tomography apparatus, in which: reference symbol $T_i$ denotes a two-dimensional tomogram (B-scan image); and $A_{ij}$, a scanning line (A-scan). The two-dimensional tomogram $T_i$ comprises a plurality of scanning lines $A_{ij}$ located on the same plane.

In FIG. 9, 9c shows an example of the irradiation distribution of near-infrared light applied to the retina, when viewed from the fundus surface in the depth direction of the retina, in capturing the two-dimensional tomogram $T_i$. In 9c of FIG. 9, ellipses $A_{i1}$ to $A_{im}$ represent the diameters of near-infrared light spots.

In FIG. 9, 9b shows an example of a tomogram of the retina imaged by the tomography apparatus, more specifically a two-dimensional tomogram $T_i'$ obtained by imaging the same imaging range as that indicated by 9a in FIG. 9 with double the number of scanning lines. In FIG. 9, 9d shows an example of the irradiation distribution of near-infrared light applied to the retina, when viewed from the fundus surface in the depth direction of the retina, in capturing the two-dimensional tomogram $T_i'$. In 9d of FIG. 9, ellipses $A_{i1}$ to $A_{i2m}$ represent the diameters of near-infrared light beams.

As is obvious from 9a and 9b in FIG. 9, if the imaging range remains the same, the resolution of a two-dimensional tomogram increases with an increase in the number of scanning lines. In addition, as is obvious from 9c and 9d in FIG. 9, in order to increase the resolution by increasing the number of scanning lines, it is necessary to irradiate the retina with near-infrared light such that adjacent beams overlap each other.

The method of generating a high-resolution two-dimensional tomogram by irradiating an object with adjacent beams so as to make them overlap each other is generally called the oversampling method.

The averaging method is a method of generating a tomogram with little noise by averaging and combining a plurality of tomograms captured by scanning the same imaging range with the same number of scanning lines a plurality of number of times (see, for example, Japanese Patent Laid-Open No. 2008-237238).

The two methods for generating tomograms with high image quality have the following problems. In the case of the averaging method disclosed in Japanese Patent Laid-Open No. 2008-237238, a plurality of tomograms to be averaged and combined are tomograms captured at different times. Since the pixel values of corresponding pixels of the respective tomograms are averaged, this method is effective in reducing noise contained in each tomogram. However, the resolution of each tomogram remains the same, and hence it is difficult to generate a high-resolution tomogram by combining the tomograms.

In the case of the oversampling method, it is possible to generate a tomogram with a higher resolution by increasing the number of scanning lines and increasing the overlap width. If, however, the number of scanning lines increases, the time required to capture one tomogram increases. The tomograms to be captured become susceptible to the influences of movements or flicks of the eyeballs by the patient during scanning, the movement of the head, and the like. These movements produce distortions in the captured tomograms.

In order to generate tomograms with high image quality, it is preferable to perform imaging under imaging conditions robust against the influences of movements of the eyeball, movement of the head and the like, so as to generate a high-resolution tomogram with minimum noise. On the other hand, movements of the eyeballs, movement of the head and the like vary in magnitude among different individuals; hence imaging conditions which are robust against the influences of such movements are not necessarily constant.

SUMMARY OF THE INVENTION

The present invention has been made in consideration of the above problems.

An image processing apparatus according to the present invention has the following arrangement. That is, an image processing apparatus which processes a tomogram of an eye to be examined, comprising: a detection unit configured to detect a motion amount of the eye by using a signal obtained by capturing the tomogram; and a decision unit configured to decide the number of scanning lines for capturing the tomogram based on the motion amount detected by the detection unit.

The present invention can generate a high-resolution, low-noise tomogram while minimizing the influences of movements of the eyeball, movement of the head and the like.

Further features of the present invention will become apparent from the following description of exemplary embodiments (with reference to the attached drawings).

BRIEF DESCRIPTION OF THE DRAWINGS

The accompanying drawings illustrate embodiments of the invention and, together with the description, serve to explain the principles of the invention.

DESCRIPTION OF THE EMBODIMENTS

Embodiments of the present invention will be described in detail in accordance with the accompanying drawings.

[First Embodiment]

The first embodiment of the present invention will be described below with reference to the accompanying drawings. A characteristic feature of an image processing apparatus according to this embodiment is that it detects the motion amount of an eye to be examined (per unit time) when performing imaging by the oversampling method or the averaging method and performs imaging based on imaging conditions corresponding to the detected motion amount.

This embodiment is configured to perform imaging using the oversampling method or the averaging method under imaging conditions corresponding to the motion amounts of the eyes of each individual, and hence can generate a low-noise, high-resolution tomogram while minimizing the influences of movement of the individual's eyeballs, the head or the like.

An image processing system including an image processing apparatus according to this embodiment will be described in detail below.

<Arrangement of Image Processing System>

Figure 1:
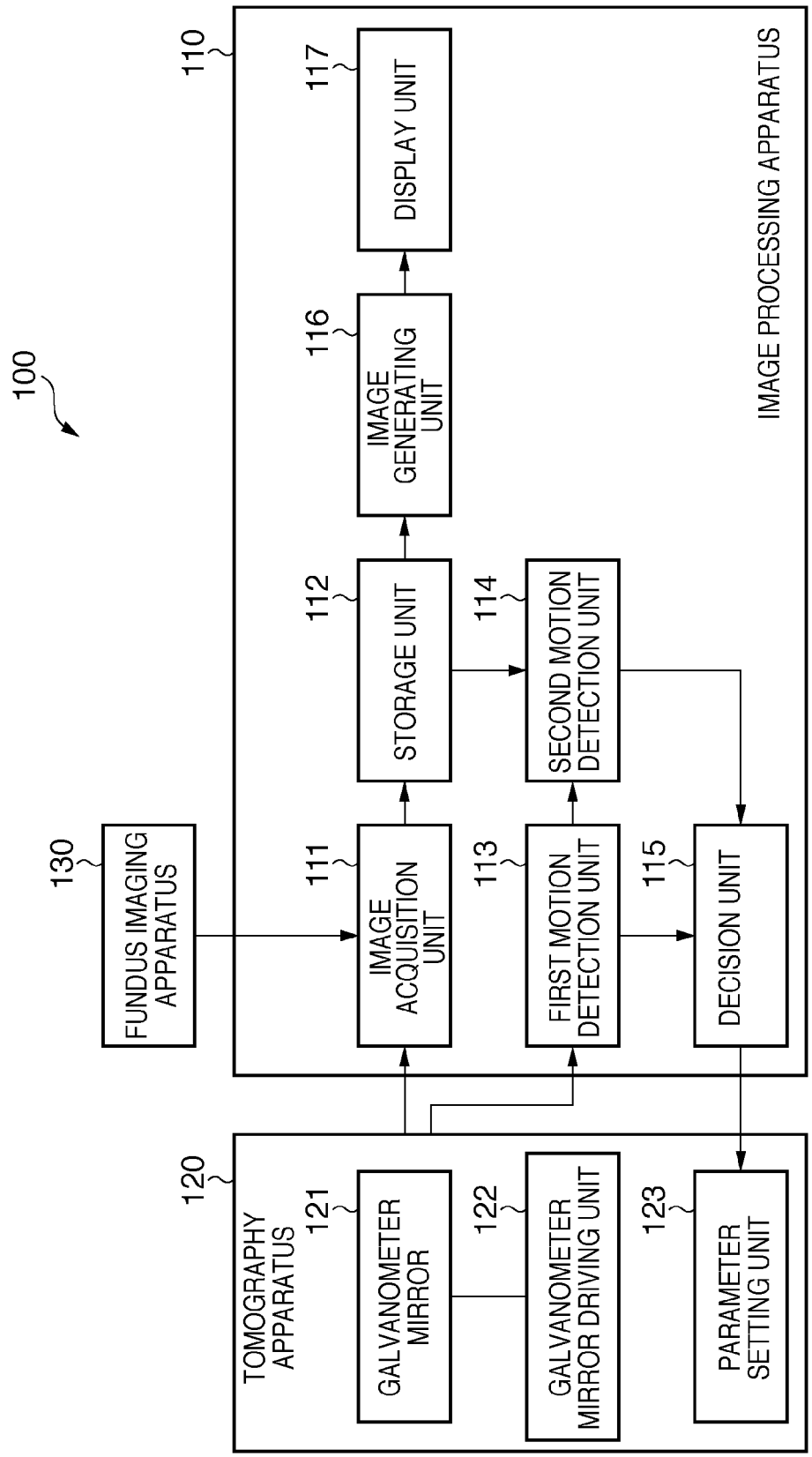
FIG. 1 is a block diagram showing the arrangement of an image processing system.

FIG. 1 is a block diagram showing the arrangement of an image processing system 100 including an image processing apparatus 110 according to this embodiment. As shown in FIG. 1, the image processing system 100 is formed by connecting the image processing apparatus 110 to a tomography apparatus 120 and a fundus imaging apparatus 130 via an interface.

The tomography apparatus 120 is an apparatus which captures a tomogram of a portion of an eye (a tomogram of the eye to be examined based on composite light obtained by combining return light from the eye irradiated with measurement light and reference light corresponding to the measurement light). Such apparatuses include, for example, a time domain OCT and a Fourier domain OCT. Note that the tomography apparatus 120 is a known apparatus, and hence a detailed description of the apparatus will be omitted. The following description relates to a function whose operational contents is changed in accordance with the number of scanning lines (the number of A-scan), the number of images captured and the like, which are set by instructions from the image processing apparatus 110.

Referring to FIG. 1, a galvanometer mirror 121 (also referred to as a scanning means for scanning measurement light) defines an imaging range in the depth direction by changing the optical path length of reference light. A galvanometer mirror driving unit 122 controls the number of rotations of the galvanometer mirror 121 (the scanning speed in the depth direction) and also controls the irradiation position of near-infrared light by the galvanometer mirror 121, thereby defining the imaging range and the number of scanning lines in the plane direction (at least one of the scanning speed in the plane direction, the main scanning speed, and the sub-scanning speed).

A parameter setting unit 123 sets, in the galvanometer mirror driving unit 122, various kinds of parameters used for operational control of the galvanometer mirror 121 by the galvanometer mirror driving unit 122. The parameters set by the parameter setting unit 123 determine imaging conditions for imaging by the tomography apparatus 120. More specifically, the number of scanning lines and the number of images captured is set in accordance with instructions from the image processing apparatus 110, determining scanning speeds in the depth direction and the plane direction.

A fundus imaging apparatus 130 is an apparatus which captures a fundus image of an eye portion. This apparatus is, for example, a fundus camera, Scanning Laser Ophthalmoscope (SLO), or the like.

The image processing apparatus 110 processes the tomogram captured by the tomography apparatus 120 to generate a tomogram to be displayed on a display unit 117. The image processing apparatus 110 includes an image acquisition unit 111, a storage unit 112, a first motion detection unit 113, a second motion detection unit 114, a decision unit 115, an image generating unit 116, and the display unit 117.

The image acquisition unit 111 acquires the tomograms and fundus images captured by the tomography apparatus 120 and the fundus imaging apparatus 130 and stores them in the storage unit 112. The first motion detection unit 113 detects the motion amount of the eye to be examined in the depth direction based on the reflected light intensity (signal intensity) measured by the tomography apparatus 120 at the time of imaging. The second motion detection unit 114 detects the motion amount of the eye in the plane direction based on the fundus image captured by the fundus imaging apparatus 130.

The decision unit 115 decides parameters (the number of scanning lines or a main scanning speed, the number of images captured or a sub-scanning speed, and the like) for imaging by the oversampling method or the averaging method based on the motion amounts of the eye detected by the first motion detection unit 113 and the second motion detection unit 114.

The image generating unit 116 processes the tomogram captured by the oversampling method or the averaging method based on the parameters determined by the decision unit 115 to generate a tomogram to be displayed on the display unit 117. The display unit 117 displays the tomogram generated by the image generating unit 116.

<Procedure for Tomogram Processing in Image Processing Apparatus>

Figure 2:
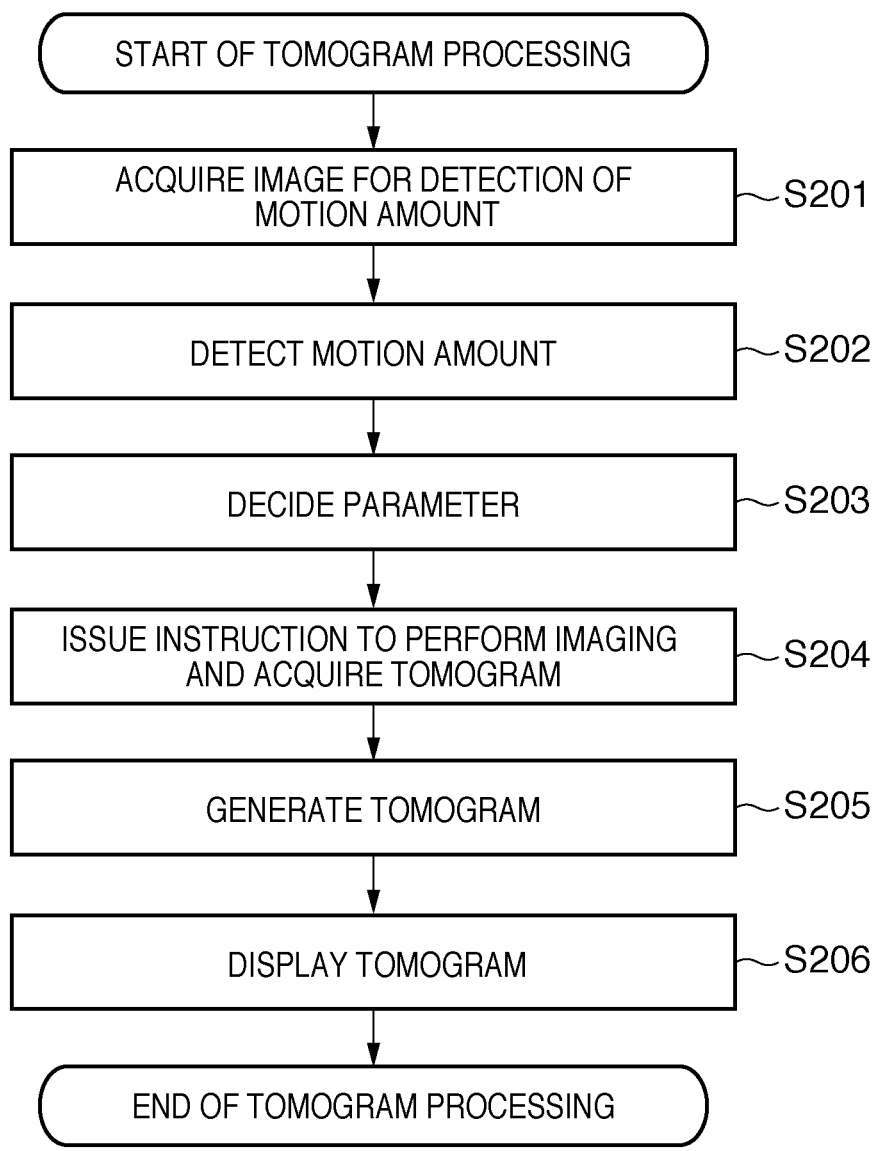
FIG. 2 is a flowchart showing a procedure for tomogram processing in an image processing apparatus.

A procedure for tomogram processing in the image processing apparatus 110 according to this embodiment will be described next with reference to FIGS. 2, 3A, and 3B.

In step S201, the tomography apparatus 120 and the fundus imaging apparatus 130 perform imaging of the eye to detect the motion amounts of the eye in response to instructions from the image processing apparatus 110. The image acquisition unit 111 acquires the tomogram and fundus image (also generically referred to as motion detection images) captured by the tomography apparatus 120 and the fundus imaging apparatus 130, respectively.

Figure 3A:
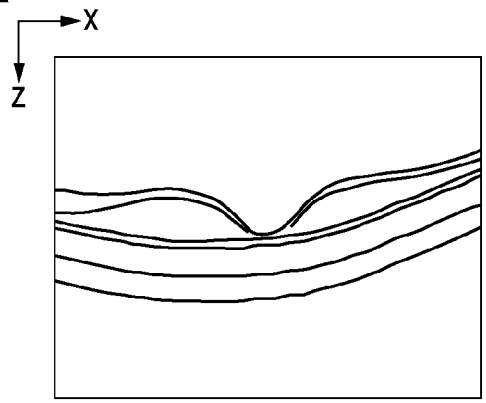
FIG. 3A is a schematic view showing an example of a tomogram.
Figure 3B:
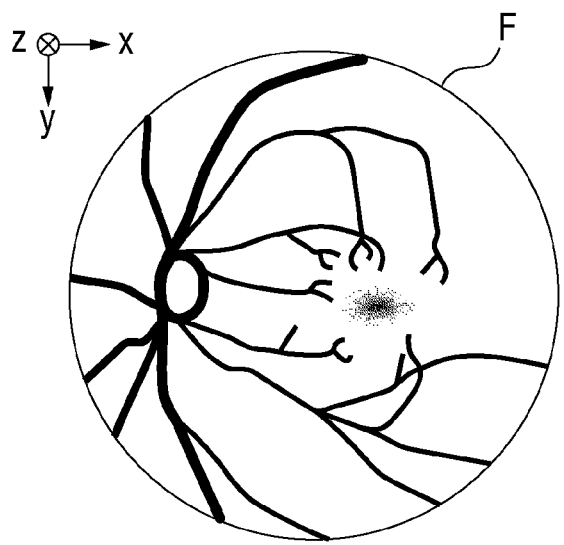
FIG. 3B is a schematic view showing an example of a fundus image.

FIGS. 3A and 3B each show an example of the motion detection image acquired by the image acquisition unit 111. FIG. 3A shows an example of the tomogram captured by the tomography apparatus 120. FIG. 3B shows an example of the fundus image captured by the fundus imaging apparatus 130. Referring to FIG. 3B, reference symbol F denotes a fundus.

In step S202, the first motion detection unit 113 and the second motion detection unit 114 detect the motion amounts of the eye. The first motion detection unit 113 detects the motion amount of the eye in the depth direction (the z-axis direction in FIG. 3A) based on the reflected light intensity of near-infrared light (the intensity of the reflection signal) applied to the eye by the tomography apparatus 120 at the time of imaging.

The second motion detection unit 114 detects the motion amount of the eye in the plane direction (the x-y-axis direction in FIG. 3B) of the eye by tracking a feature point such as a blood vessel branch portion on the fundus image acquired by the fundus imaging apparatus 130. Assume that this apparatus detects and tracks a feature point by using, for example, the KLT method (C. Tomasi, T. Kanade, "detection and tracking of point features" (see Technical report, CMUCS-91-132, 1991)) or the like (note that detection and tracking of a feature point are not limited to the KLT method).

In step S203, the decision unit 115 decides parameters constituting imaging conditions for imaging by the tomography apparatus 120 in accordance with the motion amounts of the eye respectively detected by the first motion detection unit 113 and the second motion detection unit 114. In addition, the decision unit 115 sets the decided parameters in the parameter setting unit 123 of the tomography apparatus 120. The details of parameter decision processing in the decision unit 115 will be described later.

In step S204, the image acquisition unit 111 acquires the tomogram obtained by imaging performed by the tomography apparatus 120 using the parameters decided by the decision unit 115, based on an instruction from the image processing apparatus 110.

In step S205, the image generating unit 116 processes the tomogram acquired in step S204 (for example, calculates the pixel value of each pixel by performing averaging processing of a plurality of pixels) to generate a tomogram to be displayed on the display unit 117. The details of this tomogram generating processing in the image generating unit 116 will be described later. In step S206, the display unit 117 displays the tomogram generated by the image generating unit 116.

<Details of Processing in Each Unit>

The details of processing in each unit constituting the image processing apparatus 110 will be described next.

<Details of Parameter Decision Processing in Decision Unit 115>

The details of parameter decision processing in the decision unit 115 will be described first. Assume that the image processing apparatus 110 uses a pixel count n (n>1) as the number of pixels used for averaging processing per pixel to generate a tomogram with high image quality.

The decision unit 115 decides each parameter (the number of images captured and the number of scanning lines) so as to implement averaging processing with the pixel count n and prevent the occurrence of distortion in one tomogram. This processing will be described in detail below.

Letting rx be a lateral resolution at the time of generation of a tomogram, k be the number of images captured on the same slice, and $A_m$ be the number of scanning lines on one tomogram, the lateral resolution rx, the number k of images captured, and the number $A_m$ of scanning lines have the relationship represented by equation (1):

$$n \cdot rx = k \cdot A_m \quad (1)$$

Letting f [Hz] be the A-scan frequency used by the tomography apparatus 120, a time t [s] required to capture one tomogram can be obtained from equation (2):

$$t = \frac{A_m}{f} \quad (2)$$

In this case, it is possible to obtain a lateral resolution ORx and a depth resolution ORz based on the wavelength of the light source used by the tomography apparatus 120.

In order to prevent the occurrence of distortion in one tomogram, the decision unit 115 decides parameters so as not to make the average or median of the motion amounts of the eye detected within the time taken to capture one tomogram exceed the resolutions.

That is, letting $t_{ORx}$ [s] be the time required for the eye to move by the lateral resolution ORx and $t_{ORz}$ [s] be the time required for the eye to move by the depth resolution ORz, the decision unit 115 decides parameters so as not to make $t_{ORx}$ and $t_{ORz}$ exceed t. More specifically, the number $A_m$ of scanning lines is obtained from inequalities (3) using equation (2):

$$t \le \alpha \cdot \min(t_{ORx}, t_{ORz}) \quad (3)$$

$$\frac{A_m}{f} \le \alpha \cdot \min(t_{ORx}, t_{ORz})$$

$$A_m \le \alpha \cdot \min(t_{ORx}, t_{ORz}) \cdot f$$

In addition, the number k of images captured is obtained from equation (4) using equation (1) and inequalities (3):

$$k = \frac{n \cdot rx}{A_m} \quad (4)$$

The relationship between the number $A_m$ of scanning lines on one tomogram and the number k of images captured on the same slice will be described next with reference to FIG. 4. The ordinate scale marks in FIG. 4 represent numerical values with the lateral resolution rx at the time of imaging being 512 and the number n of pixels used for averaging processing being 4.

Figure 4:
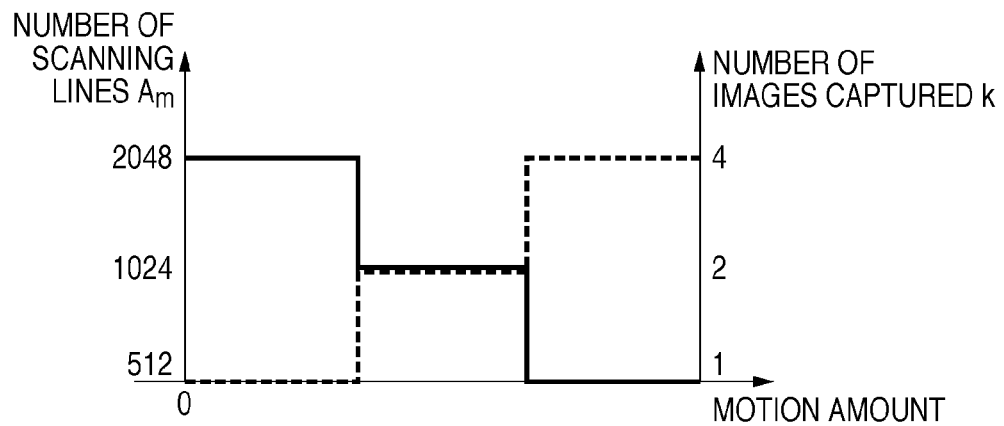
FIG. 4 is a schematic view showing an example of the relationship between the number of scanning lines and the number of images captured.

Referring to FIG. 4, the left ordinate and the solid line on the graph represent the number $A_m$ of scanning lines, and the right ordinate and the broken line on the graph represent the number k of images captured. The abscissa represents the motion amount of the eye. As shown in FIG. 4, when parameters are decided so as to prevent the occurrence of distortion in one tomogram, an increasing motion amount of the eye will decrease the number $A_m$ of scanning lines and increase the number of images captured.

Referring to FIG. 4, since the number $A_m$ of scanning lines changes in three steps, namely, 512, 1024, and 2048, the graph has a step function form. However, the number $A_m$ of scanning lines is not limited to this. For example, the number $A_m$ of scanning lines may be set to form a linear function falling diagonally to the lower right in correspondence with arbitrary numbers of scanning lines or a nonlinear function.

<Details of Tomogram Generating Processing in Image Generating Unit 116>

Figure 5:
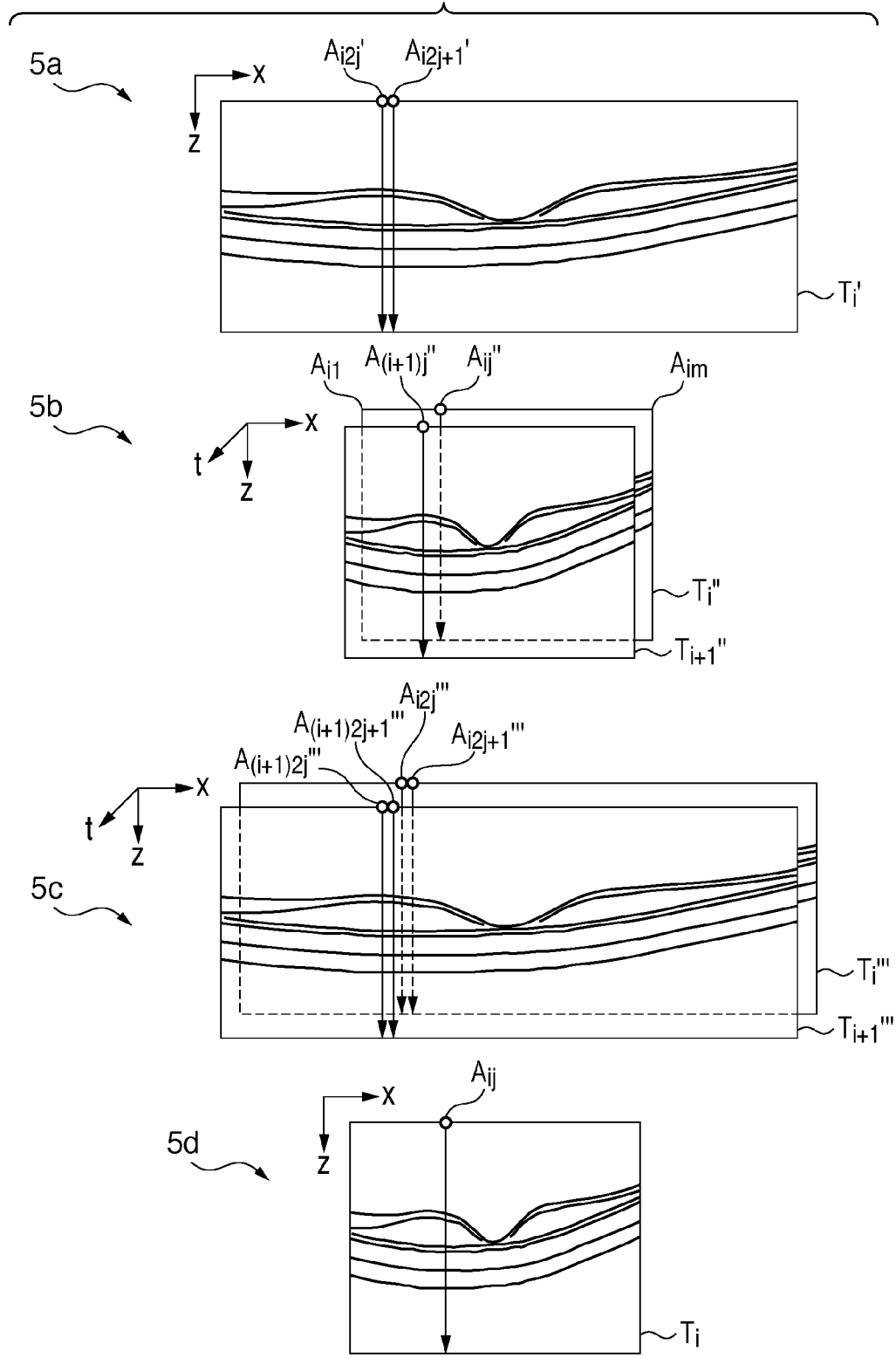
FIG. 5 explains tomogram generating processing.

The details of tomogram generating processing in the image generating unit 116 will be described next. In FIG. 5, 5a explains tomogram generating processing (averaging processing of scanning lines located on the same tomogram) of generating a tomogram by processing the tomogram captured by the oversampling method.

In FIG. 5, 5b explains tomogram generating processing (averaging processing of scanning lines located on different tomograms captured at different times) of generating a tomogram by processing the plurality of tomograms captured by the averaging method.

In FIG. 5, 5c explains tomogram generating processing (averaging processing of scanning lines located on the same tomogram and different tomograms) of generating a tomogram by processing the tomograms captured by a combination of the oversampling method and the averaging method. In FIG. 5, 5d shows the tomogram generated by tomogram generating processing. The details of each process will be described below.

(1) Tomogram Generating Processing Based on Tomogram Captured by Oversampling Method Tomogram generating processing based on the tomogram captured by the oversampling method will be described first with reference to 5a in FIG. 5. The following is a case in which imaging is performed at a resolution twice as high as the lateral resolution rx.

Referring to 5a in FIG. 5, reference symbols $A_{i2j}'$ and $A_{i2j+1}'$ denote scanning lines. Note that reference symbol $A_{i2j+1}'$ denotes a scanning line imaged 1/f [s] after imaging of the scanning line $A_{i2j}'$. In FIG. 5, 5d shows a tomogram generated by performing averaging processing using n pixels for each pixel.

That is, referring to 5d in FIG. 5, reference symbol $A_{ij}$ denotes the new scanning line calculated by performing averaging processing for the corresponding scanning lines. In the case indicated by 5a in FIG. 5, $A_{ij}$ is calculated by performing averaging processing for the scanning lines $A_{i2j}'$ and $A_{i2j+1}'$. Note that the method of processing the tomogram captured by the oversampling method of the present invention is not limited to averaging processing. For example, it is possible to use median calculation processing or weighted averaging processing.

(2) Tomogram Generating Processing for Tomogram Captured by Averaging Method

Tomogram generating processing based on the tomogram captured by the averaging method will be described next with reference to 5b in FIG. 5. A case in which the number k of images captured on the same slice is 2 will be described below.

When performing averaging processing based on a plurality of tomograms, it is necessary to position tomograms $T_i''$ and $T_{i+1}''$ in advance by using a positioning unit (not shown). For example, positioning between tomograms is performed such that an evaluation function representing the similarity between the two tomograms is defined in advance, and the tomograms are transformed to optimize the value of the evaluation function. As an evaluation function, for example, an evaluation method using pixel values (for example, an evaluation method using a mutual information amount) is available. As tomogram transformation processing, for example, the processing of performing translation and rotation using affine transformation and changing an enlargement ratio can be used. Assume that in averaging processing using a plurality of tomograms, positioning between tomograms has already been complete.

Referring to 5b in FIG. 5, the tomograms $T_i''$ and $T_{i+1}''$ are captured on the same slice at different times. Reference symbols $A_{ij}''$ and $A_{(i+1)j}''$ denote scanning lines on the tomograms $T_i''$ and $T_{i+1}''$. Note that the scanning line $A_{(i+1)j}''$ is imaged $A_m/f+\beta$ [s] after imaging of $A_{ij}''$. In this case, $\beta$ represents the time required to return the position of a scanning line from the last position ($A_{im}$ in 5b of FIG. 5) of a tomogram to the initial position ($A_{i1}$ in 5b of FIG. 5).

When generating the tomogram indicated by 5d in FIG. 5 from the tomogram indicated by 5b in FIG. 5, the apparatus calculates $A_{ij}$ indicated by 5d in FIG. 5 by performing averaging processing for the scanning lines $A_{ij}''$ and $A_{(i+1)j}''$. Note that the method of processing the tomogram captured by the averaging method of the present invention is not limited to averaging processing. For example, it is possible to use median calculation processing or weighted averaging processing.

(3) Tomogram Generating Processing for Tomogram Captured by Combination of Oversampling Method and Averaging Method Tomogram generating processing for the tomogram captured by a combination of the oversampling method and the averaging method will be described next with reference to 5c in FIG. 5. The following is a case in which the number n of times of averaging per pixel is 4, the lateral resolution is twice as high as rx, and the number k of images captured on the same plane is 2.

Referring to 5c in FIG. 5, reference symbols $A_{i2j}'''$ and $A_{i2j+1}'''$ denote scanning lines on a tomogram $T_i'''$; and $A_{(i+1)2j}'''$ and $A_{(i+1)2j+1}'''$ denote scanning lines on a tomogram $T_{i+1}'''$.

When generating the tomogram indicated by 5d in FIG. 5 from the tomogram indicated by 5c in FIG. 5, the apparatus calculates $A_{ij}$ in 5d of FIG. 5 by performing averaging processing for the scanning lines $A_{i2j}'''$, $A_{i2j+1}'''$, $A_{(i+1)2j}'''$, and $A_{(i+1)2j+1}'''$.

As is obvious from the above description, this embodiment is configured to set imaging conditions upon detecting the motion amounts of the eye for each individual and process the tomogram obtained by imaging performed by the oversampling method or the averaging method under the imaging conditions.

As a consequence, it is possible to generate a low-noise, high-resolution tomogram while minimizing the influences of the flicks of the eyeballs, the movement of the head, and the like.

Although this embodiment has exemplified the method of generating one two-dimensional tomogram with high image quality, the present invention is not limited to this. For example, the present invention may be configured to generate a three-dimensional tomogram by using the same method. Furthermore, it is possible to generate a tomogram with high image quality from the tomogram obtained by scanning radially or circularly.

[Second Embodiment]

The first embodiment described above is configured to perform imaging for the detection of motion amounts to set imaging conditions and capture a tomogram again. However, the present invention is not limited to this. For example, when performing imaging under predetermined imaging conditions and processing an acquired tomogram, the present invention may be configured to perform processing corresponding to the motion amounts of the eye. This embodiment will be described in detail below.

<Arrangement of Image Processing System>

Figure 6:
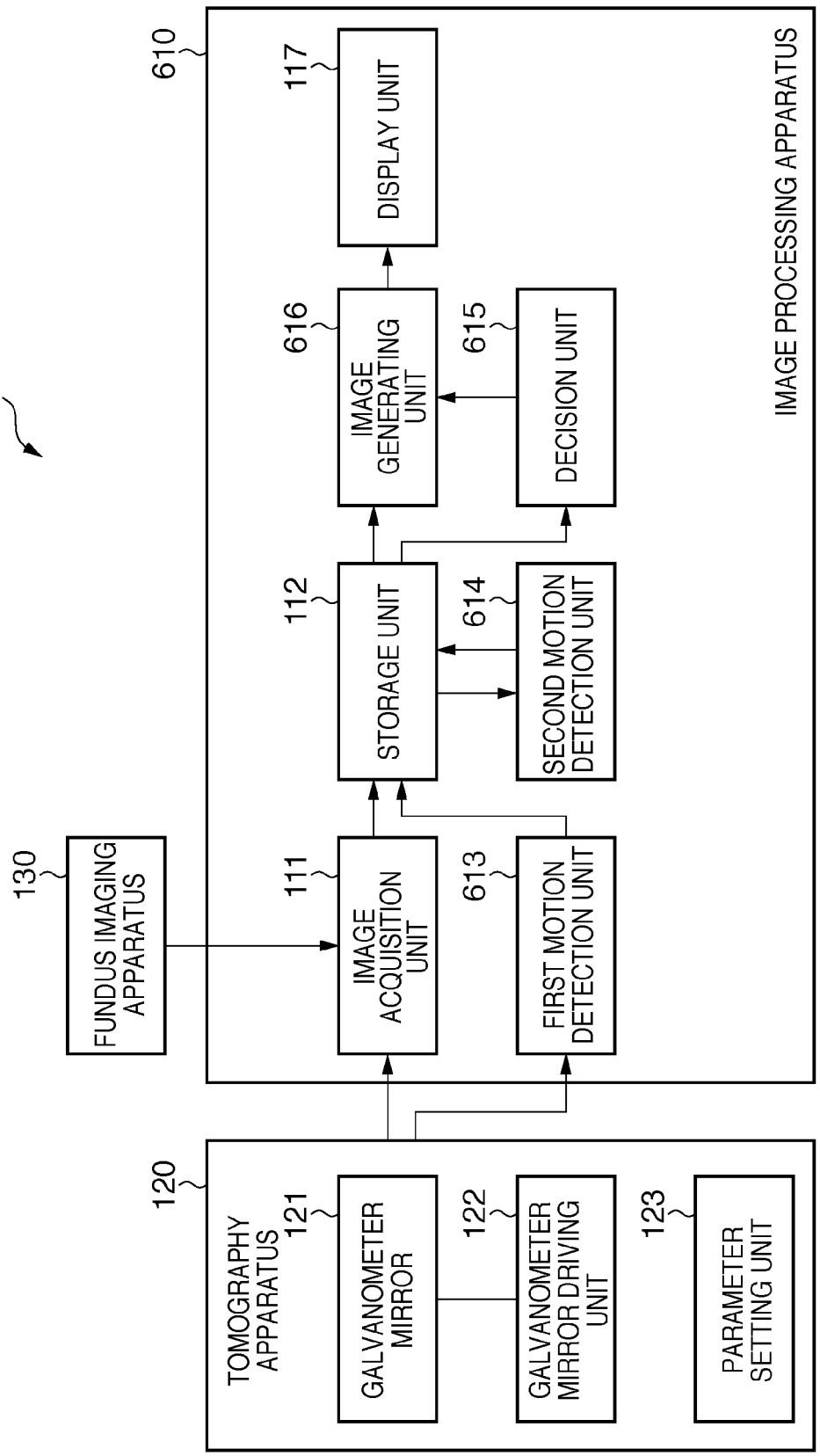
FIG. 6 is a block diagram showing the arrangement of an image processing system.

FIG. 6 is a block diagram showing the arrangement of an image processing system 600 including an image processing apparatus 610 according to this embodiment. As shown in FIG. 6, the image processing system 100 described in the first embodiment differs in functional arrangement from the image processing apparatus 610. The differences between the functional arrangements will be mainly described below.

As shown in FIG. 6, the image processing apparatus 610 includes an image acquisition unit 111, a storage unit 112, a first motion detection unit 613, a second motion detection unit 614, an image generating unit 616, a display unit 117, and a decision unit 615. Of these units, the image acquisition unit 111, the storage unit 112, and the display unit 117 have the same functions as those in the first embodiment, and hence a description of them will be omitted.

The first motion detection unit 613 detects the motion amount of the eye to be examined in the depth direction based on the reflected light intensity (signal intensity) measured by a tomography apparatus 120 at the time of imaging. When detecting a motion amount exceeding a depth resolution ORz obtained from the wavelength of a light source used in the tomography apparatus 120, the first motion detection unit 613 records the time of the detection on the storage unit 112.

The second motion detection unit 614 detects the motion amount of the eye in the plane direction based on the fundus image captured by a fundus imaging apparatus 130. When detecting a motion amount exceeding a lateral resolution ORx obtained from the wavelength of the light source used in the tomography apparatus 120, based on a fundus image, while the tomography apparatus 120 captures a tomogram, the second motion detection unit 614 records the time of the detection on the storage unit 112.

The decision unit 615 selects a tomogram with a small motion amount as a reference tomogram, and determines based on the result recorded on the storage unit 112 whether there is a pixel whose motion amount exceeds a predetermined threshold. If there is a pixel whose motion amount exceeds the predetermined threshold, the decision unit 615 selects a scanning line used for averaging processing for the pixel.

The image generating unit 616 performs averaging processing using a selected scanning line for a pixel, whose motion amount exceeds a predetermined threshold, of one of the tomograms recorded on the storage unit 112 which is selected as a reference tomogram by the decision unit 615.

<Procedure for Tomogram Processing in Image Processing Apparatus>

Figure 7A:
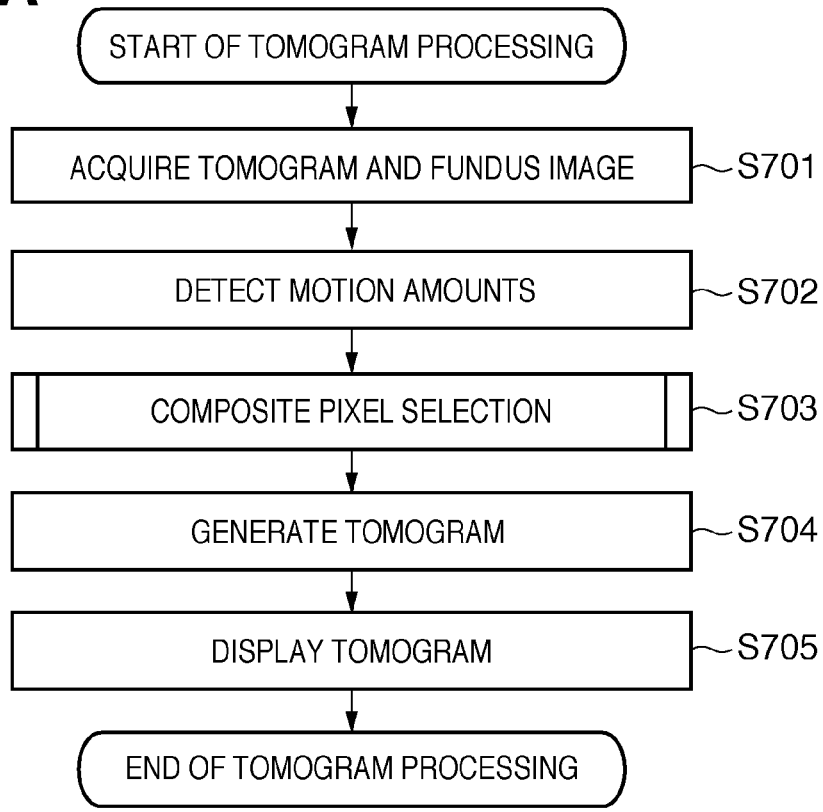
FIGS. 7A and 7B are flowcharts showing procedures for tomogram processing in the image processing apparatus.
Figure 7B:
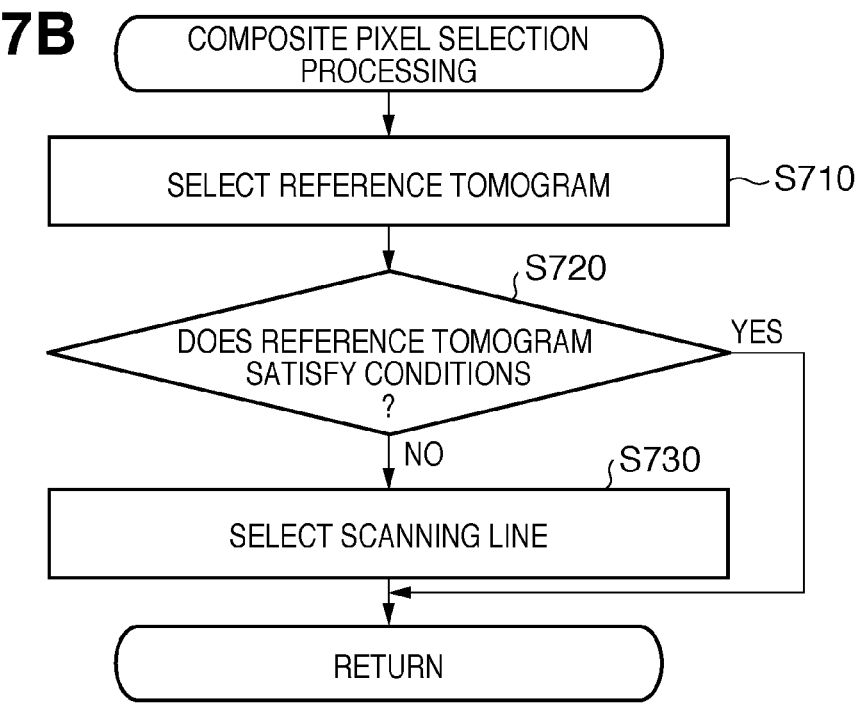

A procedure for tomogram processing in the image processing apparatus 610 of this embodiment will be described next with reference to FIGS. 7A and 7B.

In step S701, the tomography apparatus 120 and the fundus imaging apparatus 130 perform imaging of the eye based on instructions from the image processing apparatus 610. Note that the tomography apparatus 120 performs imaging of the eye using the parameters set in advance by a parameter setting unit 123 (performs imaging with, for example, a number $A_m$ of scanning lines being 2048 and a number k of images captured on the same slice being 4).

In step S702, the first motion detection unit 613 and the second motion detection unit 614 detect the motion amounts of the eye. Note that since the motion amount detection method has already been described in the first embodiment, a description of the method will be omitted. When there are motion amounts exceeding the lateral resolution ORx and the depth resolution ORz obtained from the wavelength of a light source while one tomogram is captured, the first motion detection unit 613 and the second motion detection unit 614 detect the motion amounts and record the time of the detection on the storage unit 112.

In step S703, the decision unit 615 performs composite pixel selection processing of selecting pixels subjected to averaging processing based on the motion amounts detected in step S702 and the tomogram captured in step S701. This composite pixel selection processing (step S703) will be described in detail with reference to the flowchart of FIG. 7B.

Assume that in the description of composite pixel selection processing (step S703), the number n of pixels used for averaging processing for the selected pixel is 4, a lateral resolution rx is 512, the number $A_m$ of scanning lines is 2048, and the number k of images captured on the same slice is 4.

In step S710, the decision unit 615 selects a reference tomogram from a plurality of tomograms. The decision unit 615 selects in step S702, as a reference tomogram, a tomogram exhibiting the motion amount of the eye which does not exceed the lateral resolution ORx and the depth resolution ORz within the time taken to capture one tomogram. If there is no tomogram which satisfies these conditions, the decision unit 615 selects a tomogram whose maximum motion amount or average motion amount is smallest within the time taken to capture one tomogram. Alternatively, the decision unit 615 sets each tomogram as a reference tomogram, and positions other tomograms relative to the respective reference tomograms, thereby finally selecting a tomogram whose average positioning evaluation value relative to the other tomograms is high.

In step S720, the decision unit 615 determines whether the reference tomogram satisfies predetermined conditions. More specifically, the decision unit 615 determines whether the motion amounts of the eye depicted on the reference tomogram selected in step S710 exceed the lateral resolution and the depth resolution. Upon determining in step S720 that the motion amounts do not exceed the lateral resolution and the depth resolution, the decision unit 615 terminates the composite pixel selection processing.

If the decision unit 615 determines that the motion amount of the eye depicted on the reference tomogram exceeds the lateral resolution or the depth resolution, the process advances to step S730 to perform averaging processing for the scanning lines of the tomogram captured by a combination of the oversampling method and the averaging method.

In step S730, the decision unit 615 associates the times at which each scanning line of the reference tomogram was imaged with the time at which motion amount exceeding the lateral resolution ORx or the depth direction ORz was detected. The decision unit 615 then selects a scanning line of the reference tomogram captured at the time at which the motion amount exceeding the lateral resolution or the depth resolution was detected and a scanning line of a tomogram other than the reference tomogram on the same slice, between which and the selected scanning line of the reference tomogram averaging processing is performed.

Referring back to FIG. 7A, in step S704, the image generating unit 616 processes the tomogram captured by the tomography apparatus 120. In this case, the image generating unit 616 performs averaging processing by using the scanning lines selected in step S730 for the reference tomogram selected in step S710 to generate a tomogram to be displayed on the display unit 117. Assume that the image generating unit 616 performs averaging processing for each scanning line based on the method indicated in step S205.

As is obvious from the above description, this embodiment is configured to detect the motion amounts of the eye while imaging the eye and process the acquired tomogram in accordance with the detected motion amounts.

This makes it possible to generate a low-noise, high-resolution tomogram while minimizing the influences of the flicks of the eyeballs, the movement of the head, and the like.

[Third Embodiment]

The first embodiment described above is configured to decide parameters based on the tomogram and fundus image acquired by imaging for the detection of the motion amounts of the eye and process the tomogram acquired by imaging using the decided parameters. However, the present invention is not limited to this. For example, the present invention may be configured to detect motion amounts even while performing imaging using decided parameters, decide parameters again upon detecting a motion amount equal to or more than a predetermined threshold, and automatically redo imaging.

This makes it possible to keep generating tomograms with high image quality even if a large change, for example, blinking or microsaccades, occurs during imaging, because parameters are set again based on the motion amounts detected during imaging.

Figure 8:
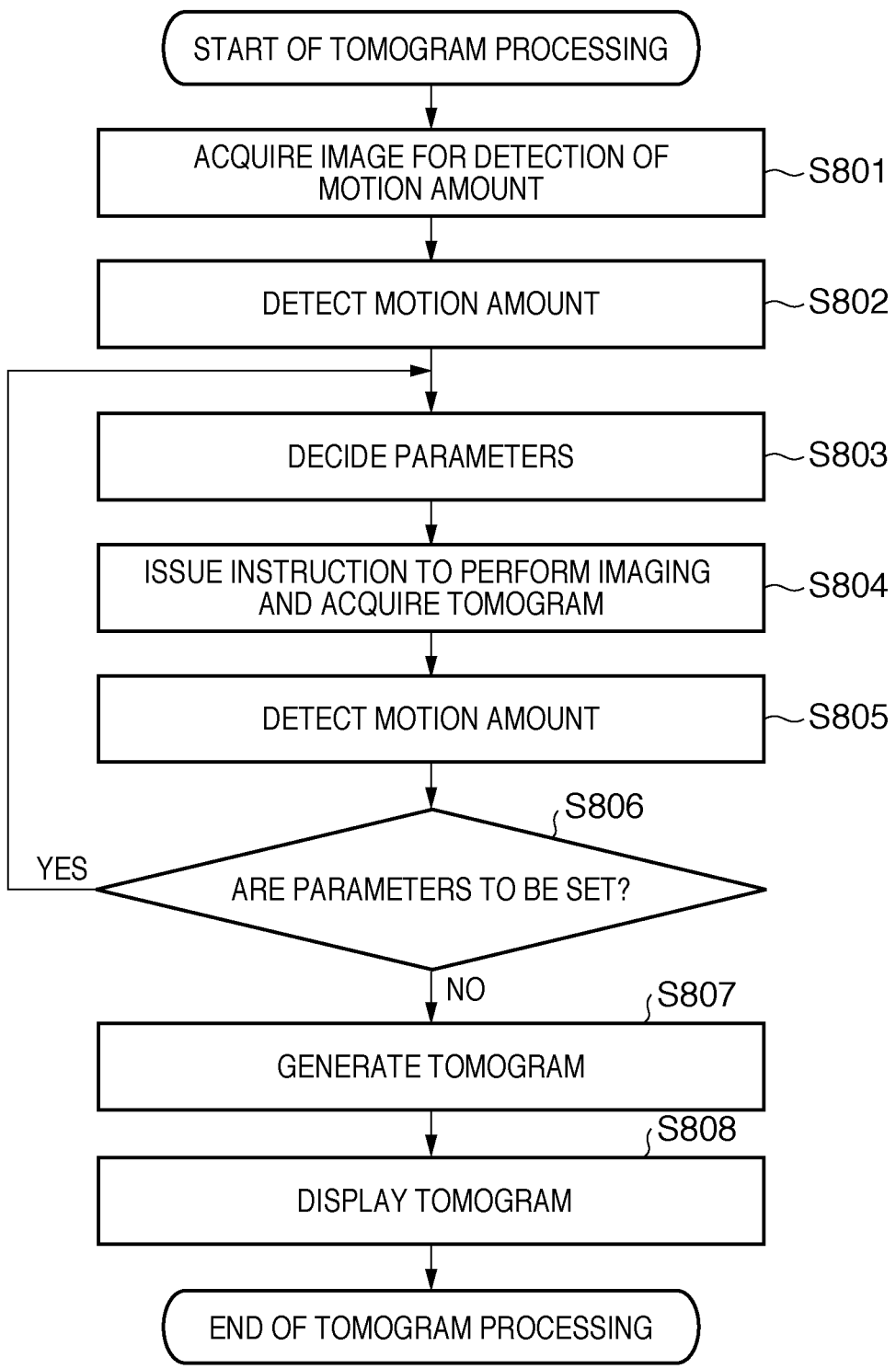
FIG. 8 is a flowchart showing a procedure for tomogram processing in the image processing apparatus.
Figure 9:
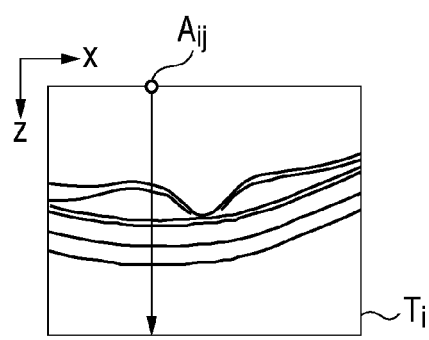
FIG. 9 explains the oversampling method.
Figure 9:
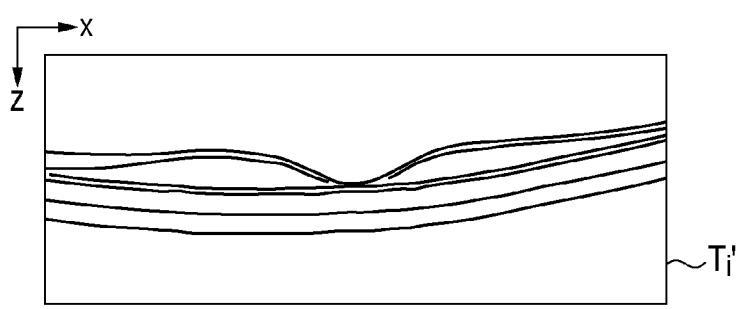
Figure 9:
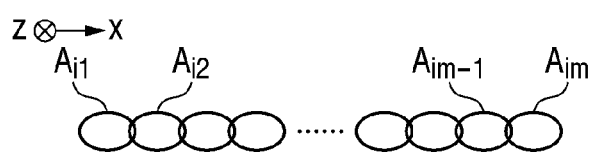
Figure 9:
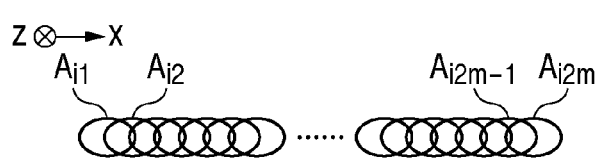

This embodiment will be described in detail below with reference to FIG. 8. Note that the functional arrangement of an image processing apparatus of the third embodiment is the same as that of the image processing apparatus according to the first embodiment. In addition, of the tomogram processing (FIG. 8) in the image processing apparatus of the third embodiment, the processing from step S801 to step S804 is the same as that from step S201 to step S204 in the tomogram processing (FIG. 2) in the image processing apparatus according to the first embodiment. The processing in steps S805, S807, and S808 is the same as that in steps S202, S205, and S206. For this reason, only the processing in step S806 will be described below.

In step S806, a decision unit 115 determines whether to perform imaging again if the motion amount of the eye exceeds a predetermined threshold. More specifically, when the position of the eye greatly shifts due to the blinking or microsaccades of the object during imaging of one tomogram, the decision unit 115 returns to the step S803 to decide to set parameters again. When the position of the eye has shifted, the position of the eye also shifts from the positions on tomograms on the same slice which have been captured so far. For this reason, this apparatus sets parameters again and performs imaging (step S804).

As is obvious from the above description, this embodiment is configured to detect motion amounts during capturing of a tomogram and perform imaging again if a detected motion amount exceeds a predetermined threshold. As a consequence, even if a large change, for example, blinking or microsaccades, occurs during imaging, this apparatus automatically performs imaging again. This makes it possible to keep generating tomograms with high image quality.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-278945 filed Dec. 8, 2009, which is hereby incorporated by reference herein in its entirety.

What is claimed is:

1. An image processing apparatus which processes a tomogram of an eye to be examined, the apparatus comprising:
    a detection unit configured to detect a motion amount of the eye; and
    a decision unit configured to use a processor to decide the number of scanning lines for capturing the tomogram and the number of capturing the tomograms so that an increasing motion amount detected by said detection unit is conducive to decrease the number of scanning lines and to increase the number of capturing the tomograms.

2. The apparatus according to claim 1, wherein detection of a motion amount of the eye by said detection unit includes at least one of (a) detection of a motion amount of the eye in a depth direction by using a signal obtained by capturing the tomogram, and (b) detection of a certain amount of motion of the eye in a plane direction based on a signal obtained by capturing the tomogram and a fundus image of the eye.

3. The apparatus according to claim 1, further comprising a generating unit configured to, when the tomogram captured under the imaging condition decided by said decision unit includes a plurality of tomograms, generate one tomogram by performing averaging processing for pixel values of corresponding pixels of the plurality of captured tomograms.

4. The apparatus according to claim 1, wherein the tomogram of an eye to be examined is generated based on composite light obtained by combining return light from the eye and reference light corresponding to a measurement light, and
    wherein the apparatus further comprises a scanning unit configured to scan the measurement light at a scanning speed based on a signal from said detection unit.

5. The apparatus according to claim 4, wherein the scanning speed is at least one of a main scanning speed and a sub-scanning speed.

6. The apparatus according to claim 4, wherein said detection unit detects a motion amount of the eye per unit time.

7. The apparatus according to claim 1, wherein the apparatus (1) is connected to a tomography apparatus to capture a tomogram of an eyeball and a fundus imaging apparatus to capture a fundus image and (2) processes a tomogram captured by the tomography apparatus,
    wherein a detection unit detects a motion amount of the eyeball in a depth direction during capturing of one tomogram by using a signal obtained by imaging performed by the tomography apparatus and detecting a motion amount of the fundus in a plane direction during capturing of the one tomogram by using a fundus image obtained by imaging performed by the fundus imaging apparatus, and
    wherein the image processing apparatus further comprises:
    (a) a selection unit configured to select, as a reference tomogram, a tomogram exhibiting the smallest motion amount of the eyeball in the depth direction and the smallest motion amount of the fundus in the plane direction, detected by said detection unit at the time of imaging, from a plurality of tomograms of the eyeball on the same slice obtained by imaging performed by the tomography apparatus; and
    (b) a generating unit configured to generate a tomogram by performing averaging processing for a pixel value of a pixel, of pixels included in the reference tomogram, which is imaged by the tomography apparatus when said detection unit detects a motion amount exceeding a predetermined threshold, by using pixel values of pixels included in other tomograms corresponding to the pixel or pixel values corresponding to a plurality of scanning lines superimposed on the pixel.

8. The apparatus according to claim 1, further comprising a positioning unit configured to position a plurality of tomograms of the eye to be examined, the plurality of tomograms being of a number equal to the number of capturing the tomograms, based on a similarity between the tomograms.

9. The apparatus according to claim 1, further comprising a generating unit configured to generate one tomogram by performing an averaging process for pixel values of corresponding pixels of each of a plurality of tomograms of the eye to be examined, the plurality of tomograms being of a number equal to the number of capturing the tomograms.

10. The apparatus according to claim 1, wherein the decision unit decides the number of scanning lines so that at least one of a motion amount of the eye in a depth direction and in a plane direction does not exceed resolutions for capturing the tomograms.

11. The apparatus according to claim 9, wherein the detection unit detects the motion amount of the eye during capturing the plurality of tomograms, the plurality of tomograms being of a number equal to the number of capturing the tomograms.

12. The apparatus according to claim 11, further comprising a selection unit configured to select, as a reference tomogram, a tomogram exhibiting the smallest motion amount detected by the detection unit from the plurality of tomograms, the plurality of tomograms being of a number equal to the number of capturing the tomograms,
wherein the generating unit generates one tomogram by performing averaging processing by using a pixel value of a pixel, of pixels included in the reference tomogram, when the detection unit detects a motion amount exceeding a predetermined threshold, by using pixel values of pixels included in other tomograms corresponding to the pixel or pixel values corresponding to a plurality of scanning lines superimposed on the pixel.

13. The apparatus according to claim 11, wherein the decision unit decides the number of scanning lines and the number of capturing the tomograms again when the detection unit detects a motion amount exceeding a predetermined threshold.

14. The apparatus according to claim 1, wherein the detection unit detects a motion amount of the eye to be examined in the depth direction based on intensity of reflection light from the eye to be examined to which the scanning unit irradiates light, and
wherein the detection unit detects a motion amount of the eye to be examined in the plane direction based on characteristic area of a fundus image of the eye to be examined.

15. The apparatus according to claim 1, wherein the detection unit detects a motion amount exceeding resolutions in the depth direction corresponding to a wavelength of a light resource as the motion amount of the eye.

16. The apparatus according to claim 14, further comprising a recording unit configured to, when the detection unit detects the motion amount exceeding resolutions in the depth direction corresponding to a wavelength of a light resource as the motion amount of the eye, record the time of detection.

17. The apparatus according to claim 1, wherein a relationship between the motion amount of the eye to be examined and the number of scanning lines for capturing the tomograms of the eye to be examined and a relationship between the motion amount of the eye to be examined and the number of capturing the tomograms are respectively represented as one of a linear function, a non-linear function, or a step function.

18. The apparatus according to claim 9, wherein the generating unit generates the one tomogram by performing averaging processing, median calculation processing, or weighted averaging processing for pixel values of corresponding pixel of each of the plurality of the tomograms of the eye to be examined, the plurality of tomograms being of a number equal to the number of capturing the tomograms.

19. The apparatus according to claim 1, wherein the detection unit detects the motion amount of the eye by using a signal obtained by capturing the tomogram.

20. An image processing method in an image processing apparatus which processes a tomogram of an eyeball imaged by a tomography apparatus, the method comprising:
a detection step of detecting a motion amount of the eyeball; and
a decision step of using a processor to decide the number of scanning lines for capturing the tomogram and the number of capturing the tomograms so that an increasing motion amount detected in the detection step is conducive to decrease the number of scanning lines and to increase the number of capturing the tomograms.

21. The method according to claim 20, wherein the image processing apparatus (1) is connected to a tomography apparatus to capture a tomogram of an eyeball and a fundus imaging apparatus to capture a fundus image and (2) processes a tomogram captured by the tomography apparatus,
wherein a detection step detects a motion amount of the eyeball in a depth direction during capturing of one tomogram by using a signal obtained by imaging performed by the tomography apparatus and detects a motion amount of the fundus in a plane direction during capturing of the one tomogram by using a fundus image obtained by imaging performed by the fundus imaging apparatus, and
wherein the method further comprises:
(a) a selection step of selecting, as a reference tomogram, a tomogram exhibiting the smallest motion amount of the eyeball in the depth direction and the smallest motion amount of the fundus in the plane direction, detected in the detection step at the time of imaging, from a plurality of tomograms of the eyeball on the same slice obtained by imaging performed by the tomography apparatus; and
(b) a generation step of generating a tomogram by performing averaging processing for a pixel value of a pixel, of pixels included in the reference tomogram, which is imaged by the tomography apparatus when a motion amount exceeding a predetermined threshold is detected in the detection step, by using pixel values of pixels included in other tomograms corresponding to the pixel or pixel values corresponding to a plurality of scanning lines superimposed on the pixel.

22. A storage medium storing a program for causing a computer to execute each step in a method according to claim 20.

23. The method according to claim 20, further comprising a positioning step of positioning for a plurality of tomograms of the eye to be examined, the plurality of tomograms being of a number equal to the number of capturing the tomograms, based on a similarity between the tomograms.

24. The method according to claim 20, further comprising a generating step of generating one tomogram by performing an averaging process for pixel values of corresponding pixels of each of the plurality of the tomograms of the eye to be examined, the plurality of tomograms being of a number equal to the number of capturing the tomograms.

25. The method according to claim 20, wherein the number of scanning lines is decided in the decision step so that at least one of a motion amount of the eye in a depth direction and in a plane direction does not exceed resolutions for capturing the tomograms.

26. The method according to claim 24, wherein the motion amount of the eye during capturing the plurality of tomograms, the plurality of tomograms being of a number equal to the number of capturing the tomograms, is detected in the detection step.

27. The method according to claim 26, wherein the number of scanning lines and the number of capturing the tomograms are decided in the decision step again when the detection unit detects a motion amount exceeding a predetermined threshold.

28. The method according to claim 20, wherein the detection step detects the motion amount of the eyeball by using a signal obtained by capturing the tomogram.

29. An image processing apparatus which processes a tomogram of an eye to be examined, the apparatus comprising:
   detection means for detecting a motion amount of the eye;
   decision means for using a processor to decide the number of scanning lines for capturing the tomogram so that an increasing motion amount detected by said detection means is conducive to decrease the number of scanning lines;
   acquisition means for acquiring a plurality of tomograms of the eye captured by using the decided number of scanning lines; and
   selection means for selecting a tomogram, on which effects of the eye motion is smaller than effects of the eye motion on the other tomograms, from the acquired plurality of tomograms.

30. The apparatus according to claim 29, wherein the number of scanning lines for capturing the tomogram and the number of capturing tomograms of the eye are decided by said decision means so that an increasing motion amount detected by said detection means is conducive to decrease the number of scanning lines, and to increase the number of capturing tomograms.

31. The apparatus according to claim 29, further comprising processing means for positioning between the selected tomogram and at least one tomogram of the other tomograms, and for performing averaging processing.

32. The apparatus according to claim 29, wherein decreasing the number of scanning lines corresponds to increasing scanning speed.

33. The apparatus according to claim 29, wherein said detection means detects the motion amount of the eye by using a signal obtained by capturing the tomogram.

34. An image processing method in an image processing apparatus which processes a tomogram of an eyeball imaged by a tomography apparatus, the method comprising:
   a detection step of detecting a motion amount of the eyeball;
   a decision step of using a processor to decide the number of scanning lines for capturing the tomogram so that an increasing motion amount detected in the detection step is conducive to decrease the number of scanning lines;
   an acquisition step of acquiring a plurality of tomograms of the eye captured by using the decided number of scanning lines; and
   a selection step of selecting a tomogram, on which effects of the eye motion is smaller than effects of the eye motion on the other tomograms, from the acquired plurality of tomograms.

35. The method according to claim 34, the number of scanning lines for capturing the tomogram and the number of capturing tomograms of the eye are decided in the decision step so that an increasing motion amount detected in the detection step is conducive to decrease the number of scanning lines, and to increase the number of capturing tomograms.

36. The method according to claim 34, further comprising a processing step of positioning between the selected tomogram and at least one tomogram of the other tomograms, and of performing averaging processing.

37. The method according to claim 34, wherein decreasing the number of scanning lines corresponds to increasing scanning speed.

38. A storage medium storing a program for causing a computer to execute each step in a method according to claim 34.

39. The method according to claim 34, wherein the detection step detects the motion amount of the eyeball by using a signal obtained by capturing the tomogram.

* * * * *